United States Patent
Kolehmainen et al.

(10) Patent No.: US 10,601,267 B2
(45) Date of Patent: Mar. 24, 2020

(54) ROTOR FOR A SYNCHRONOUS RELUCTANCE ELECTRIC MACHINE, AN ELECTRIC MACHINE, AND A MANUFACTURING METHOD OF A ROTOR

(71) Applicant: ABB Schweiz AG, Baden (CH)

(72) Inventors: Jere Kolehmainen, Saint-Aubin-lès-Elbeuf (FR); Jouni Ikäheimo, Kurikka (FI); Kari Heikfolk, Laihia (FI); Tero Känsäkangas, Vaasa (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/237,924

(22) Filed: Jan. 2, 2019

(65) Prior Publication Data

US 2019/0157925 A1    May 23, 2019

Related U.S. Application Data

(63) Continuation of application No. PCT/EP2017/065866, filed on Jun. 27, 2017.

(30) Foreign Application Priority Data

Jul. 1, 2016   (EP) ..................................... 16177550

(51) Int. Cl.
| | | |
|---|---|---|
| H02K 1/24 | (2006.01) | |
| H02K 15/02 | (2006.01) | |
| H02K 1/30 | (2006.01) | |

(52) U.S. Cl.
CPC ........... *H02K 1/246* (2013.01); *H02K 15/022* (2013.01); *H02K 1/30* (2013.01)

(58) Field of Classification Search
CPC .......... H02K 1/246; H02K 21/16; H02K 1/02; H02K 19/20; H02K 1/148; H02K 1/24; H02K 37/02

(Continued)

(56) References Cited

U.S. PATENT DOCUMENTS 5,818,140 A * 10/1998 Vagati .................... H02K 1/246
                                                        310/185
8,638,012 B2 * 1/2014 Moghaddam .......... H02K 1/246
                                                        310/216.057

(Continued)

FOREIGN PATENT DOCUMENTS

| EP | 1734639 A2 | 12/2006 |
| EP | 2928047 A1 | 10/2015 |

(Continued)

OTHER PUBLICATIONS

European Patent Office, International Search Report & Written Opinion issued in corresponding Application No. PCT/EP2017/065866, dated Aug. 31, 2017, 13 pp.

(Continued)

*Primary Examiner* — Thanh Lam
(74) *Attorney, Agent, or Firm* — Taft Stettinius & Hollister LLP; J. Bruce Schelkopf

(57) ABSTRACT

The invention relates to a rotor for a synchronous reluctance electric machine. It includes a stack of consecutive magnetically conductive core elements; each core element includes at least two adjacent sectorial sections with flux barriers and a central area surrounding the rotational axis. A binding structure includes core end plates which form together with interconnection casts a unitary casted structure. The interconnection casts are casted into channels extending through the stack and which are located in an area defined by the flux barriers of the adjacent sectorial sections and the central area of each core element.

20 Claims, 5 Drawing Sheets

(58) Field of Classification Search
USPC .................. 310/162, 163, 269, 216.107, 185
See application file for complete search history.

(56) References Cited

U.S. PATENT DOCUMENTS

| | | | | |
|---|---|---|---|---|
| 9,800,125 | B2* | 10/2017 | Ballweg | H02K 19/14 |
| 2003/0020351 | A1* | 1/2003 | Lee | H02K 1/246 |
| | | | | 310/156.53 |
| 2003/0111927 | A1 | 6/2003 | Takita et al. | |
| 2014/0167550 | A1* | 6/2014 | Huang | H02K 1/2766 |
| | | | | 310/156.19 |
| 2015/0372546 | A1* | 12/2015 | Buttner | H02K 15/02 |
| | | | | 310/216.107 |
| 2015/0372577 | A1* | 12/2015 | Haussmann | H02K 15/12 |
| | | | | 310/211 |
| 2016/0056674 | A1 | 2/2016 | Buettner et al. | |

FOREIGN PATENT DOCUMENTS

| | | |
|---|---|---|
| GB | 1241995 | 8/1971 |
| WO | 2012000561 A1 | 1/2012 |
| WO | 2014166555 A2 | 10/2014 |

OTHER PUBLICATIONS

European Patent Office, Search Report issued in corresponding Application No. 16177550.7, dated Dec. 7, 2016, 2 pp.

\* cited by examiner

ROTOR FOR A SYNCHRONOUS RELUCTANCE ELECTRIC MACHINE, AN ELECTRIC MACHINE, AND A MANUFACTURING METHOD OF A ROTOR

FIELD

The invention relates to a rotor for an electric machine and to a manufacturing method of a rotor and also to an electric machine comprising such a rotor. In this context, electric machine refers especially to electric motors and to electric generators.

BACKGROUND

In rotors, the rotor core of a synchronous reluctance electric machine such as electric motor is formed by arranging plurality of core elements into a stack by laminating the core elements together so as to form a stack of consecutive core elements. The core elements are approximately circular, plate-like core elements made of magnetically conductive material, the material such as electric steel having high value of relative permeability.

Each core element of the rotor and therefore also the formed combination i.e. rotor core is operationally divided in sectorial sections. The number of sectorial sections defines the number of poles of the electric motor.

Each of the sectorial sections has at least one magnetic flux barrier. The flux barriers may be a transversal (compared to rotational axis and compared to radius of the rotor core) openings that are axially directed going through the core elements. The flux barriers may be filled with electrically conductive material such as aluminium which has a lower relative permeability than the magnetically conductive basic material (such as electric steel, as stated above) of the core elements.

In synchronous reluctance electric machines and rotors, one can define a d-axis (direct axis) and a q-axis (quadrature axis). Both the d-axis and the q-axis are extending in the direction of the radius of the rotor core, but there is an angle between the d-axis and the q-axis. In a rotor and rotor core, the area with a high magnetic permeability is defining the direction of the d-axis, and the area with a lower magnetic permeability is defining the direction of the q-axis. The torque affecting to the rotor core and to rotor is optimal when magnetic conductivity on d-axis is as high as possible and the magnetic conductivity on q-axis is as low as possible.

In practise, the lower permeability and therefore the lower conductivity on the q-axis area is achieved by the above mentioned transversal flux barriers that may be either empty openings i.e. cut-outs or openings but filled with conductive material having lower magnetic permeability i.e. lower conductivity than the basic material of the core elements.

One aspect relating to synchronous reluctance electric motors and the rotors of those motors is the way how is it is secured that the core elements of the rotor remain firmly together in the stack on consecutive core elements. Therefore, the question relates to the binding means holding the core elements to each other so as to create the tight stack of core elements. This is an important aspect because the rotational speed of the rotor and included rotor core can be several thousand rpm (revolutions per minute). In synchronous reluctance motors, it is a common practice to use axially oriented stud bolts as binding means for holding the core elements together. Those stud bolts are extending through stack of core elements and also though the end plates that are assembled to both ends the stack of core elements. Those stud bolts are equipped with associated tightening means such as nuts.

However, the use of stud bolts or similar structures is not optimal, in regard to costs and the needed manual work. The location of the binding means can also create problems for the electro-magnetic operation of the rotor.

Documents EP1734639, EP2928047 and WO 2012/000561 provide some additional features but still the level of integration is not yet satisfactory.

Therefore, there is a need for a further improvement.

BRIEF DESCRIPTION

The present invention seeks to provide an improvement. According to an aspect of the present invention, there is provided a rotor as specified in claim 1.

According to another aspect of the present invention, there is provided a synchronous reluctance electric machine, as specified in claim 13.

According to a further aspect of the present invention, there is provided a method of manufacturing a rotor, as specified in claim 13.

The basic idea of the invention is to use, together with casted end plates, suitably located casts as means for binding the core elements to each other to create a tight and robust stack of core elements, but not only to create interconnection casts through the rotor core but to cast also the end plates, interconnected by interconnection casts, to the ends of the rotor core. Suitably located meaning in this context that the interconnection cast are situated in such area that the location of the interconnection cast does not affect the electro-magnetic operation and performance.

The preferred embodiments are discussed in the dependent claims. Some aspects of the preferred embodiments relate to use of casting, not only to create interconnection casts through the rotor core but to cast an internal support cast extending through the central axial hole of the rotor core.

BRIEF DESCRIPTION OF THE DRAWINGS

In the following the invention will be described in greater detail by means of preferred embodiments with reference to the attached drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while the Figures illustrate various embodiments, they are simplified diagrams that only show some structures and/or functional entities. It is apparent to a person skilled in the art that the described apparatus may also comprise other functions and structures than those described in Figures and text.

Figure 2:
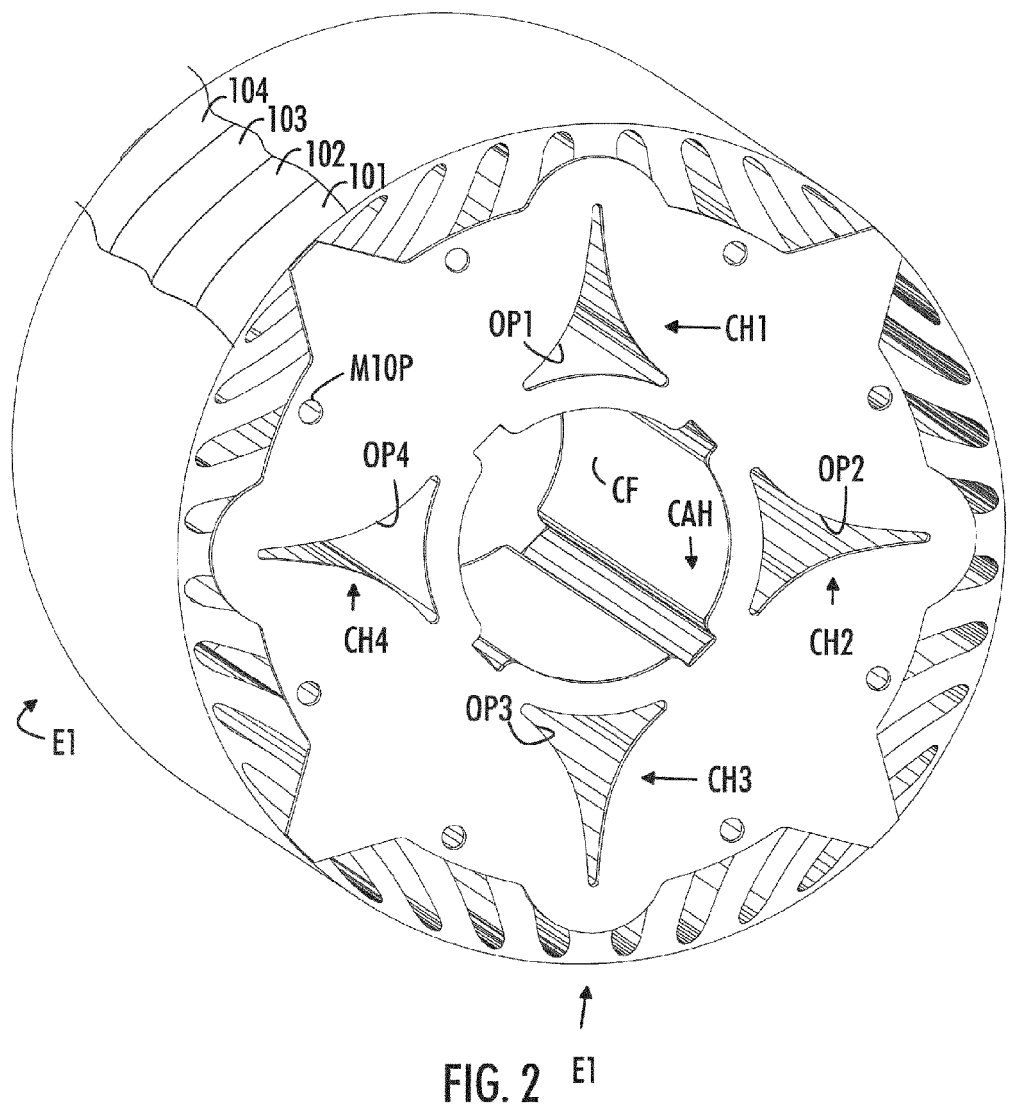
FIG. 2 illustrates, at the first end of the rotor core, the rotor core with a casting-related first mask at the first end of the rotor core, at a phase before casting.
Figure 3:
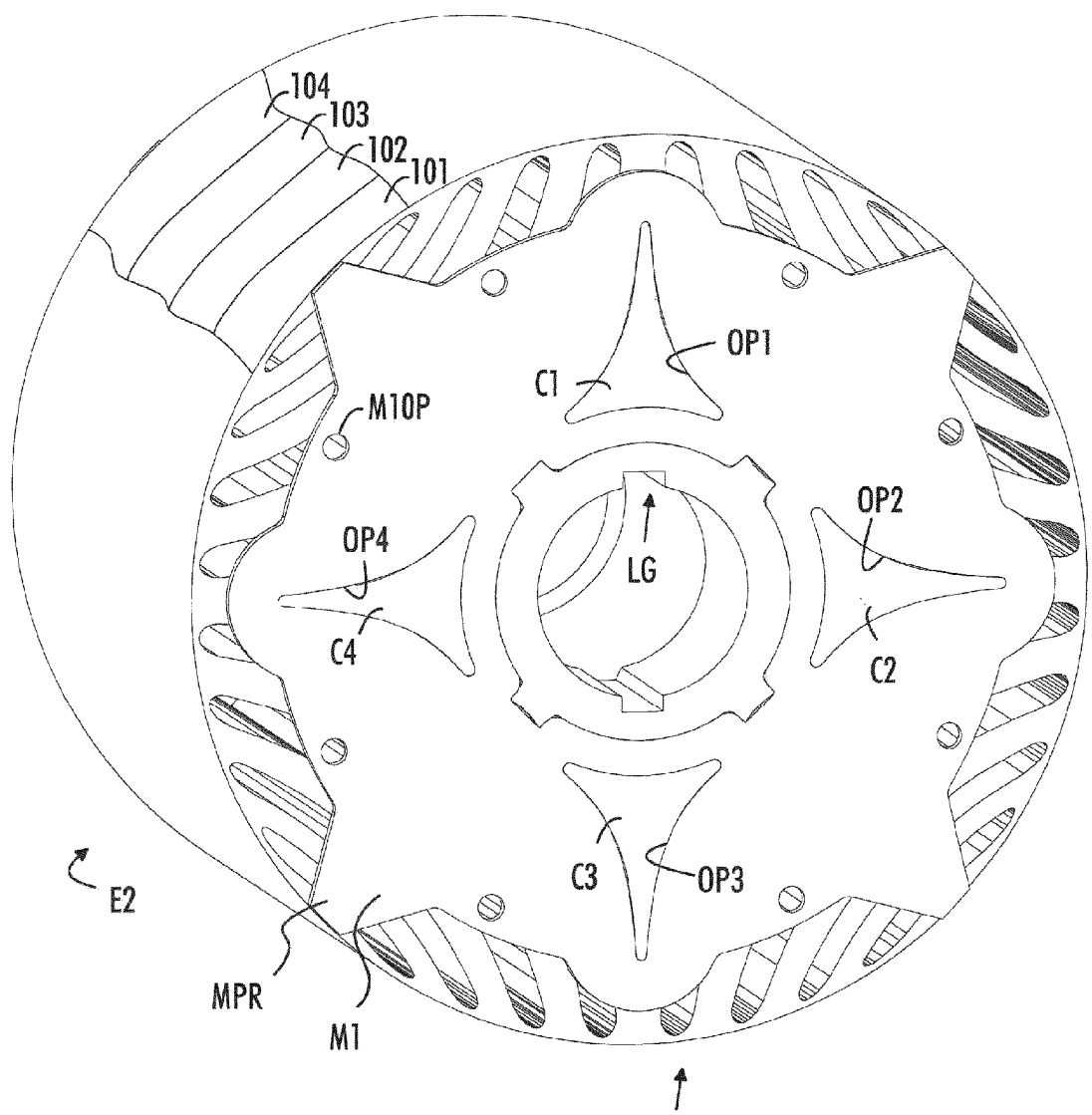
FIG. 3 illustrates, at the first end of the rotor core, the rotor core with a casting-related first mask at the first end of the rotor core, at a phase after the casting before.
Figure 4:
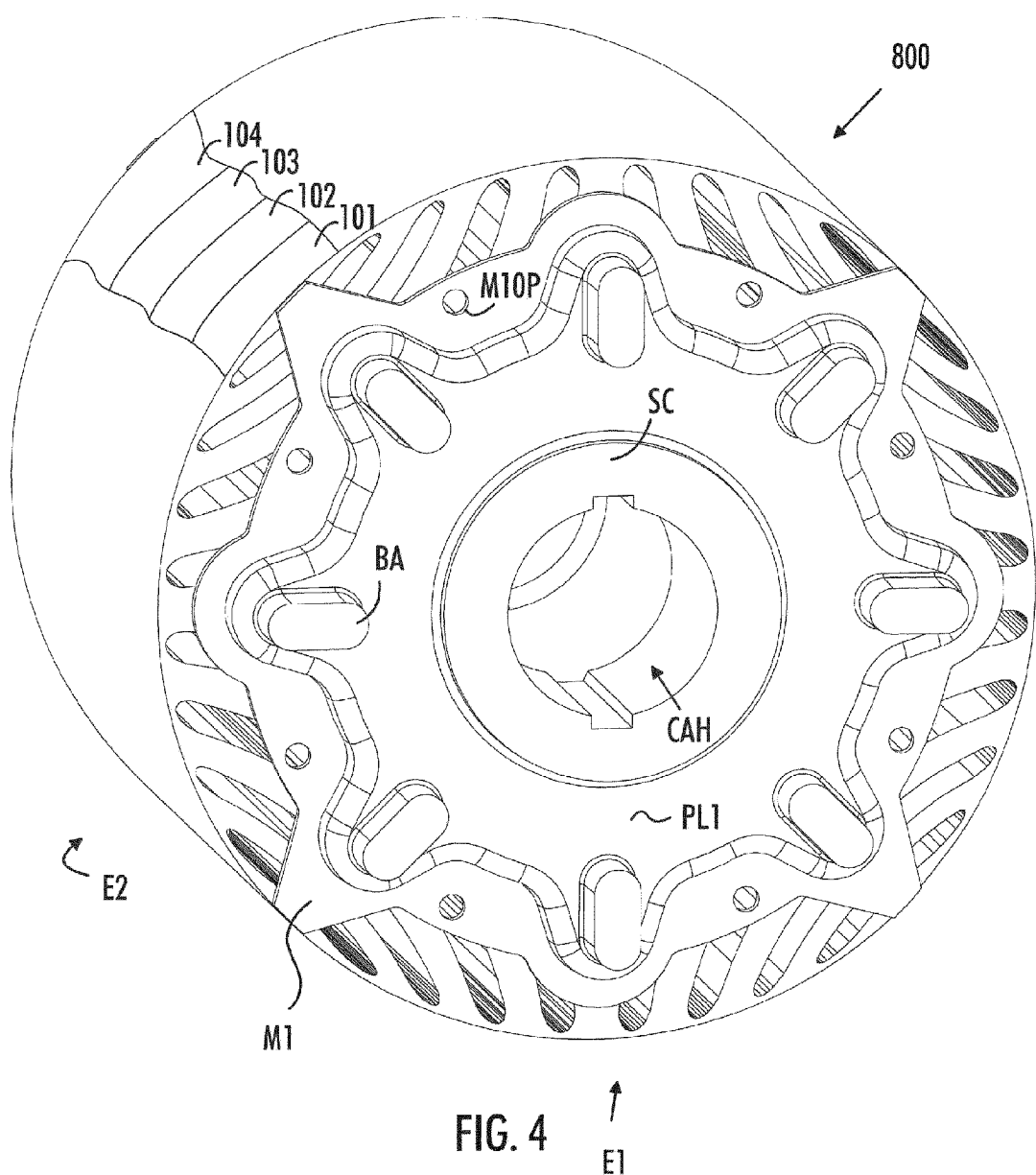
FIG. 4 illustrates, at the first end of the rotor, the rotor with a casting-related first mask being cover by casted and thereafter machined end plate with balancing pads.

Figures, especially FIGS. 2-4, illustrate an example of rotor 800 having several consecutive core elements 101-104. In practice, the number of consecutive core elements can be clearly higher than in this shown embodiment where there are only four core elements.

Core elements 101-104 are typically laminated together for forming the stack of consecutive core elements. Core elements 101-104 are insulated from each other, so they are not in galvanic contact with each other.

Let us now discuss about core element 101, which is the first element at the first end E1 of the rotor. The other core elements 102-104 can have same structures as core element 101.

The core element 101 may be a round plate which is made of material having first magnetic conductance. In an embodiment, the core element 101 may have a constant thickness. For example, the material of the core element 101 may be electrical steel.

The core element 101 comprises a plurality of sectorial sections S1-S4 distributed round a rotational axis RA of the core element 101. The number of the sectorial sections S1-S4 defines the number of poles of the electric motor. In the embodiment shown, there are four sectorial sections S1-S4, defining four poles.

Each of the sectorial sections S1-S4 comprises at least one flux barrier, in sectorial section S1 flux barriers FB11-FB14 of a second magnetic conductance, this second magnetic conductance being lower than the magnetic conductance of the material of first conductance from which material the core element 101 is made of. The magnetic conductance can be expressed using relative permeability. A higher magnetic conductance of a material means that the material has a higher relative permeability. The other three sectional sections S2-S4 have flux barriers FB21-24, FB31-34, FB41-FB44.

Sectorial sections S1-S4 have conductive ridges R11-R14, R21-R24, R31-R34, R41-R44 next to and/or between the corresponding flux barriers FB11-FB14, FB21-24, FB31-34, FB41-FB44. Ridges R11-R14, R21-R24, R31-R34, R41-R44 are magnetically conductive and are also flux paths.

Sectorial section S1 comprises flux barriers FB11-FB14, each flux barrier can be unitary or, as in the enclosed figures, it can be divided to halves or to other sub units by supporting bridges BR1. Likewise, sectorial section S2 comprises flux barriers FB21-FB24, sectorial section S3 comprises flux barriers FB31-FB34 and finally sectorial section S4 comprises flux barriers FB41-FB44.

Figure 1:
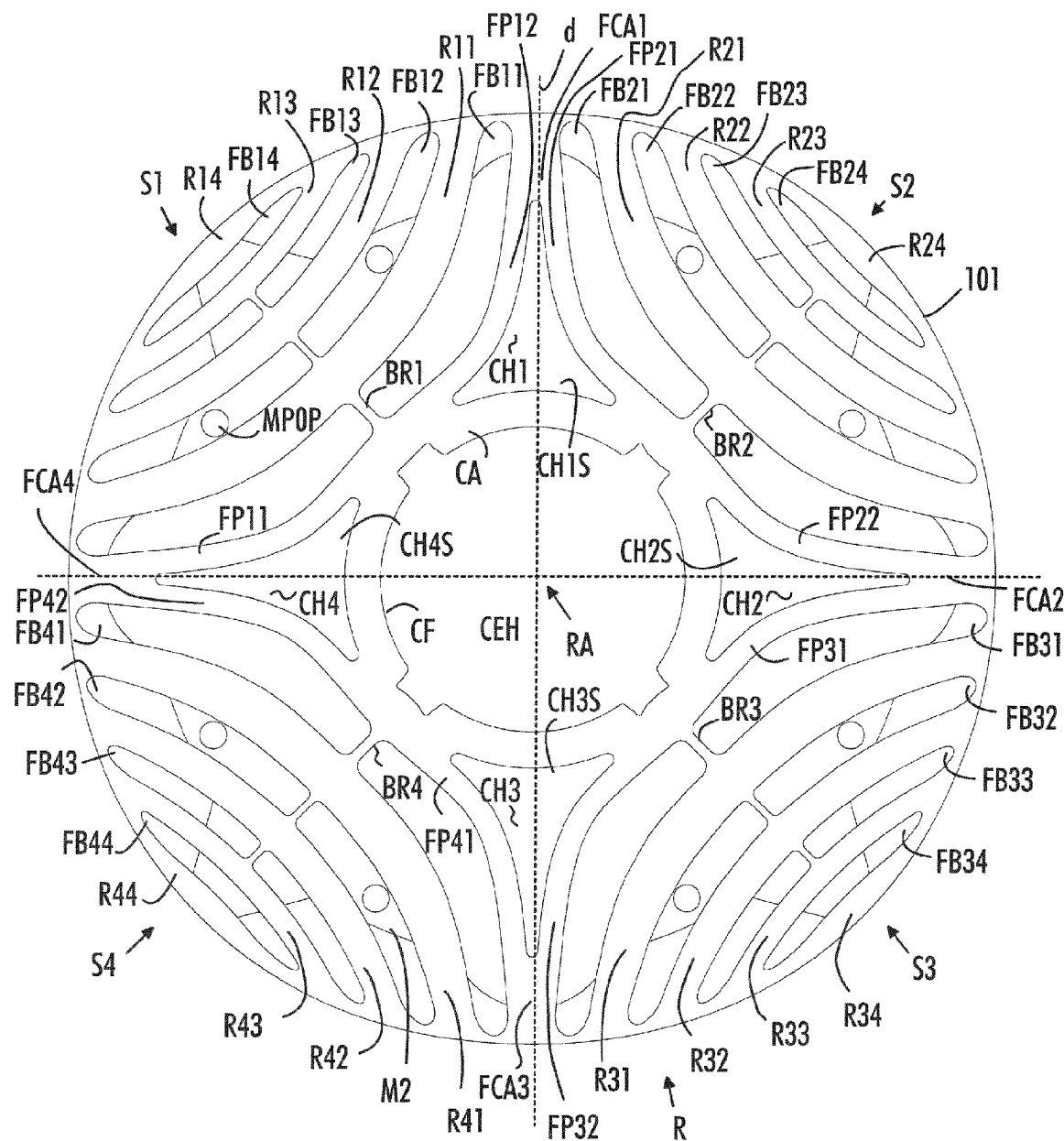
FIG. 1 illustrates, at the first end of the rotor, the rotor with a casting-related second mask behind the rotor core
Figure 5:
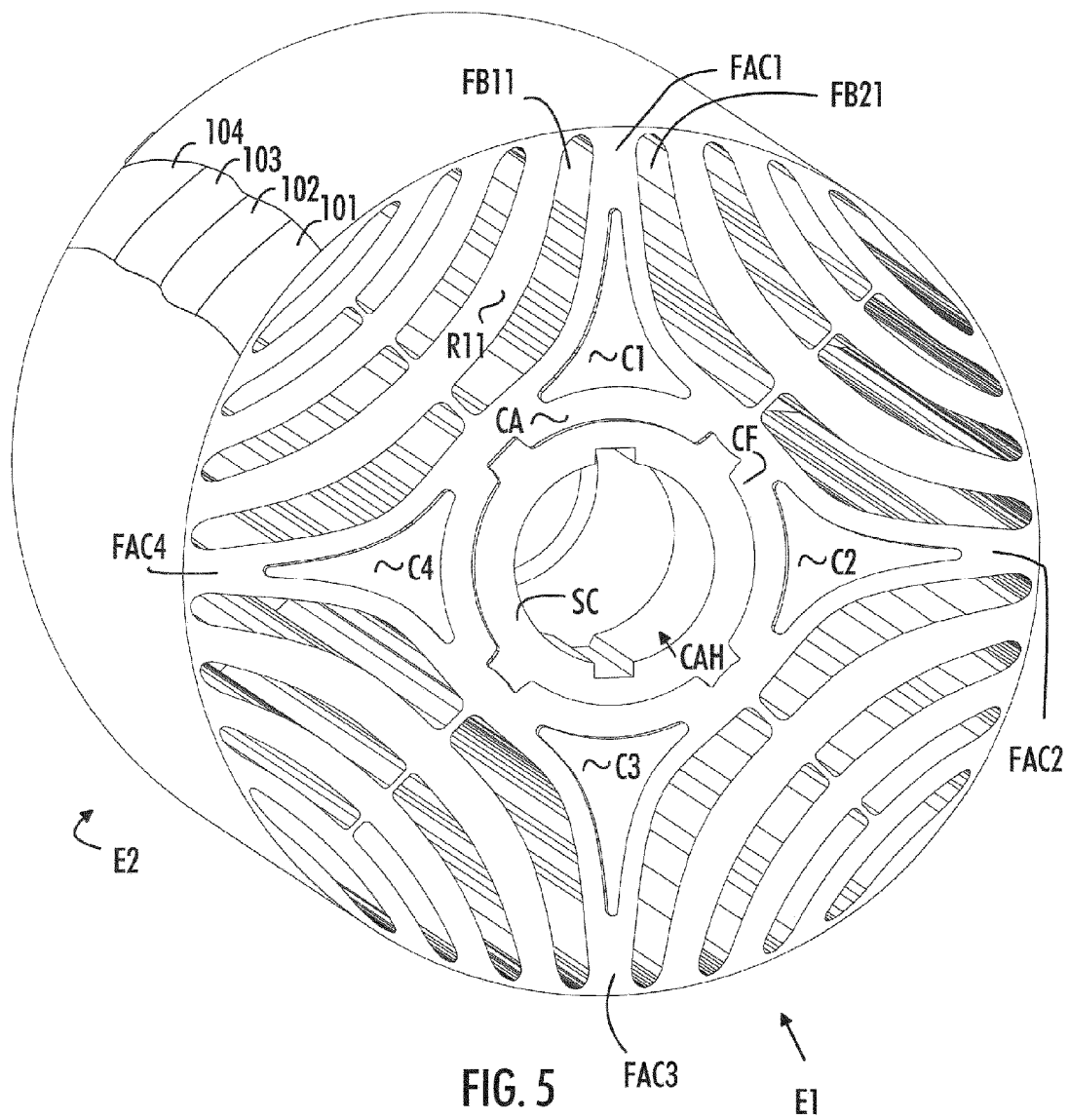
FIG. 5 illustrates, at the first end of the rotor, the rotor after the casting of the interconnection casts and the support cast, but for informative purposes without the cast-related first mask.

As was the case with sectorial section S1, also in sectorial sections S2-S4 the each flux barrier FB21-24, FB31-34, FB41-FB44 can be single unit or it can be divided to halves or to other sub units by a supporting bridges BR2-BR4, as can be seen in FIGS. 1 and 5.

In the figures, the flux barriers, such as FB11-FB14, are openings i.e. voids, but they can also be at least partially filled with a material, such as aluminum, that has lower magnetic conductivity than the magnetic conductance of the material having first conductance from which material the core elements 101-104 are made of.

The core elements are such that core element, such as 101 comprises at least two adjacent sectorial sections S1-S4 at least partially around a rotational axis RA of the rotor, each core element 101-104 further comprising central area CA (shown for core element 101) surrounding the rotational axis RA of the rotor.

In this context rotational axis RA can be either regarded to be non-physical i.e. virtual axis/centerline around which the rotation can occur or rotational axis can be regarded as real axle or shaft on which the rotor core is arranged.

Mere lamination of core elements 101-104 to each other is not enough. Therefore the rotor comprises binding structure C1-C4 for holding together the stack of consecutive core elements so as to form a rotor core having a first end E1 and a second end E2.

This binding structure for core elements 101-104 of the rotor of the synchronous reluctance electric machine is a casted structure comprising interconnection casts C1-C4 that are casted into the channels CH1-CH4 extending through the stack of core elements. The location of the channels CH1-CH4 defines the location of the interconnection casts C1-C4.

In an embodiment, the interconnection casts such as cast C1 completely fills the corresponding channel such as CH1.

In an embodiment, the material for interconnection casts C1-C4 into channels CH1-CH is aluminum. Because the core elements 101-104 comprise or in practice are made of material of high conductivity (high magnetic conductance) such as electric steel, then the material for the interconnection cast C1-C4 has lower conductivity, therefore material such as aluminum is suitable.

Those channels CH1-CH4 for the interconnection C1-C4 casts and the corresponding interconnection casts C1-C4 are located in the rotor core in an area defined by flux barriers, such as FB11, FB21, of the adjacent sectorial sections, such as S1 and S2, and the central area CA of the core element.

In an embodiment, the way/structure how the flux barriers FB11, FB21 of the adjacent sectorial sections S1, S2 and the central area CA of the core element define the location of the channels CH1-CH4 and the corresponding related casts C1-C4 is that channels CH1-CH4 for the interconnection C1-C4 casts and the corresponding interconnection casts C1-C4 are located in the rotor core in an area limited by the flux barriers of the adjacent sectorial sections, such as S1 and S2 and the central area CA of the core element.

Referring to above, the above mentioned "defined by" and "limited by", relating to the location area of the interconnecting channels CH1-CH4 and the corresponding casts C1-C4, are to be interpreted in such way that defining/limiting effect for the location area is valid/existing even though flux barriers, such as FB11 and FB21, are divided to halves or other sub units by using bridges such as BR1, BR2.

In an embodiment, at the inner side (closer the central area CA) of the flux barriers, such as FB11 and FB21, the conductive walls i.e. flux paths FP12, FB21 define/limit the area where the interconnection channels, such as CH1, and the corresponding casts, such as C1, are located, in addition to the location defining/limiting effect of the central are CA.

In FIGS. 1 and 2, the channels CH1-CH4 are still empty, meaning that the casting of the interconnection casts C1-C4 has not been made yet. In FIGS. 3-5 the casting of interconnection casts C1-C4 to channels CH1-CH4 has been made, however in FIG. 4 the interconnection casts C1-C4, especially the end of the interconnection casts is not visible anymore because in FIG. 4 end E1 of the rotor has been partially covered with an end plate PL1 that has been casted at the end E1 of the rotor. Similar end plate PL2 has been casted at the second end E2 i.e. rear end E2 of the rotor, so also at the second end E2 the end of the interconnection casts C1-C4 is covered with a casted end plate PL2 (similar to PL1) casted to the second end E2 of the rotor/rotor core.

In an embodiment, the channels such as channel CH1 for the interconnection cast C1 and the corresponding interconnection cast C1 are located in the rotor core in an area defined by, such as limited by, the flux barriers FB11, FB21 of the adjacent sectorial sections S1, S2 of the each core element and the central area CA of each core element.

Regarding flux barriers, in an embodiment, the area where the channel such as CH1 and the corresponding interconnection cast C1 locates, is defined by, such as limited by, the innermost flux barriers FB11 in section S1 and FB21 in section S2. Innermost meaning that it is the closest flux barrier compared to the central area CA and the rotational axis RA.

In an embodiment, the shape of the edge of the interconnection cast C1-C4 and/or the shape of the edge of the channel CH1-C44 for the interconnection cast at least partly follows the direction of the flux barrier such as FB11, FB21.

Between the channels CH1-CH4 for interconnection casts C1-C4 and the nearest i.e. innermost flux barrier, such as FB11, FB21, there are conductive flux paths. Flux paths FP11, FP12 belong to sectorial section S1, flux paths FP21, FP22 belong to sectorial section S2, flux paths FP31, FP32 belong to sectorial section S3 and flux paths FP41, FP42 belong to sectorial section S4.

Therefore, in an embodiment, interconnection channel CH1 and the corresponding interconnection cast C1 are at least partially between the flux paths FP12 and F21, to be precise the interconnection channel CH1 and the corresponding interconnection cast C1 are at least partially between the flux path FP12 of the sectorial section S1 and the flux path FP21 of the sectorial section S2 that is adjacent to sectorial section S1.

Correspondingly, interconnection channel CH2 and the corresponding interconnection cast C2 are at least partially between the flux paths FP22 and F31. To be precise the interconnection channel CH2 and the corresponding interconnection cast C2 are at least partially between the flux path FP22 of the sectorial section S2 and the flux path FP31 of the sectorial section S3 that is adjacent to sectorial section S2.

Correspondingly, interconnection channel CH3 and the corresponding interconnection cast C3 are at least partially between the flux paths FP32 and F41. To be precise the interconnection channel CH3 and the corresponding interconnection cast C3 are at least partially between the flux path FP32 of the sectorial section S3 and the flux path FP41 of the sectorial section S4 that is adjacent to sectorial section S3.

Correspondingly, interconnection channel CH4 and the corresponding interconnection cast C4 are at least partially between the flux paths FP42 and F11. To be precise the interconnection channel CH4 and the corresponding interconnection cast C4 are at least partially between the flux path FP42 of the sectorial section S4 and the flux path F141 of the sectorial section S1 that is adjacent to sectorial section S4.

In an embodiment, the shape of the edge of the interconnection casts C1-C4 and/or the shape of the edge of the channels CH1-C44 for the interconnection cast at least partly follows the direction of the flux barriers. For example, shape of the edge of the interconnection casts C1 and/or the shape of the edge of the channel CH1 for the interconnection cast C1 at least partly follows the direction of the flux barriers FB11 of sectional section S1 and of the flux barrier FB21. In an embodiment, the shape of the channel for interconnection cast and/or the shape of the interconnection cast is such the shape is wider at the inner end (closer to the central area CA and rotational axis RA) of the channel/cast and narrower at the outer end (closer to the rim R) of the channel/cast.

In synchronous reluctance rotors, the area with a high magnetic permeability is defining the direction of the d-axis. In FIG. 1 d-axis is shown with a marking "d".

The above mentioned flux paths create limited area for d-axis magnetic flux. Limited area for flux is surrounded by flux path pairs FP12, FP21 and FP22, FP31 and FP32, FP41 and FP42, FP11.

Therefore, in an embodiment, regarding the location of channels CH1-CH4 and interconnection casts C1-C4 in those channels CH1-CH4, one can say that the interconnection casts C1-C4 and the channels CH1-CH4 for interconnection cast are located within the above mentioned limited area for d-axis flux. In FIG. 1 the shape of the limited area for d-axis flux resembles the shape of a cross but with rounded inner corners between the four different branches of the cross.

In an embodiment, there are flux conducting areas FCA1-FCA4 extending at least partly radially between the outer rim R of the core element 101 and the central area CA of the core element 101, said central area surrounding the rotational axis RA of the rotor. Therefore, the channels CH1-CH4 for interconnection casts C1-C4 and the corresponding interconnection casts C1-C4 are located in the said flux conducting areas FCA1-FCA4. Flux conducting areas FCA1-FCA4 are conductive paths comprising the above mentioned flux path pairs FP12, FP21 and FP22, FP31 and FP32, FP41 and FP42, FP11, respectively. Structural-wise, one can say that the above mentioned limited area for d-axis flux and the abovementioned flux conducting area is the same. Flux paths such as FP12, FP21 and therefore also the flux conducting areas, such as FCA1, are magnetically conductive.

Regarding the flux conducting areas FCA1-FCA4, one can say that they are kind of corridors that help to separate from each other each two directly adjacent sectorial sections S1, S2, also S2, S3, also S3, S4 and also S4, S1. Those corridors are extending radially over each core element such as core element 101 and are extending between rim R and a central hole (shaft hole) CEH of the core element. The flux conducting areas i.e. corridors are also separating the flux barriers such as FB11, FB 21 of a sectorial section such as S1 from the flux barriers such as FB21, FB22 of another sectorial section such as S2.

In an embodiment, the interconnection casts C1-C4 are configured to have a rotational symmetry with respect to the rotational axis RA of the rotor. In practice, this is achieved by symmetrical location of the channels CH1-CH4 for the interconnection casts C1-C4. In an embodiment, the angular distance of channels (and interconnection casts therein) is constant, for example in such way that with four channels (and casts) the angular distance is about 90 degrees.

Let us now discuss some additional embodiments relating to structures that are integrated to the rotor by casting.

Referring to FIG. 4, in an embodiment, in addition to interconnection casts C1-C4, the binding structure further comprises end plates PL1, PL2 casted to the first end E1 of the rotor/rotor core and to the second end E2 of the rotor/rotor core. The casted end plates E1, E2 and the casted interconnection structure C1-C4 therebetween form a unitary casted structure.

In FIGS. 1-3, one can see masks M1, M2. In an embodiment, at both ends E1, E2 of rotor core the rotor core comprises a mask M1, M2 for casting.

By comparing FIGS. 2 and 4 it can be seen that in an embodiment mask M1 is at least partially covered by the corresponding end plate PL1 that is casted to the first end E1 of the rotor core, the same is true also for the mask M2 at the second end E2 with a casted end plate PL2 (not show because it is at the opposing end).

The casting of end plates PL1, PL2 to the ends E1, E2 of the rotor/rotor core can be done with a suitable mold, having at the both inner sides of the mold a suitable space for casting material that is flowing to the mold to form the casted end plates PL1, PL2. Referring to FIG. 4, when casting the end plates PL1, PL2, one can also cast balancing pads or other balancing elements BA that are forming a balancing ring at the end the rotor. Fine tuning balancing can be made by slightly machining the balancing elements BA.

Regarding end plates PL1, PL2, it is clear that the shape and type of the end plates can have different variations, and as an additional example the end plates can have a shape of a ring having more open structure than those shown in the figures.

In an embodiment, in addition to the interconnection casts C1-C4, the rotor core comprises a central support cast SC casted to the circumference CF a central axial hole CAH extending via central holes CEH through the central areas CA of the consecutive core elements 101-104. In an embodiment, the rotor has even more integrated structure, so that in an embodiment, in addition to the interconnection casts C1-C4 and the end plates PL1, PL2 casted to both ends E1, E2 of the rotor/rotor core, also the central support cast SC belongs to the same unitary casted structure. A mold containing a tube or rod for casting the support cast SC can be used.

The central support cast SC casted to the rotor/rotor core, can also function as an adapter for the shaft/axle of the rotor, especially after some machining or other operation has finalized the dimensions and/or the shape of the inner rim of the support cast SC. In FIGS. 3-4 regarding support cast SC, one can see locking grooves LG for locking the shaft/axle to the rotor, especially to the support cast SC of the rotor.

Let us now discuss the method. The method is a method of manufacturing a rotor of a synchronous reluctance electric machine. The electric machine can be an electric motor or a generator. The method comprises forming core elements 101-104 of the rotor. At least two sectorial sections S1-S4 and a central hole CEH are formed to each core element. Those sectorial sections S1-S4 are located at least partially around the central hole CEH the of the core element. The center hole CEH is defining the location of rotational axis RA of the rotor. At least one flux barrier such as FB11, FB21 is formed to each sectorial section, such as to sections S1 and S2. Flux barriers FB21-24, FB31-34, FB41-FB44 are formed when forming the core elements.

The method further comprises stacking the core elements 101-104 to a stack of consecutive core elements. Additionally, the method also comprises binding the stack of core element so as to hold together the stack of consecutive core elements so as to form a rotor core having a first end E1 and a second end E2.

A feature of the method that when forming each core element 101-104, each core element such as core element 101 is formed to include at least one interconnecting sub channel CH1S to an appropriate location. In the disclosed embodiments, each core element includes four sub channels CH1S, CH2S, CH3S, CH4S. Sub channels are extending axially through the core element 101 and the sub channel such as CH1S is formed to a core element area defined by, such as limited by, flux barriers FB11, FB21 of the adjacent sectorial sections S1, S2 of the core element 101 and the central area CA/central hole CEH of the core element.

A further feature of the method is that the binding of stack of core elements is done by casting so that the cast material is directed to flow into one or more interconnection channels CH1-CH4 locating in an area defined by adjacent sectorial sections of the core elements 101-104 and the central holes CEH of the core elements. These interconnection channels C1-C4 are formed by aligning interconnecting sub channels such as CH1S (in core element 101) of the consecutive core elements. In other words, sub channels in core element 101 are aligned with the corresponding sub channels of the other core elements 102-104.

In an embodiment, masks M1, M2 according to FIGS. 2-4 can be used. For example, the mask M1 has openings/voids OP1-OP4 that let the cast material, such as aluminum, to flow into the channels CH1-CH4 when forming the interconnection casts C1-C4. The role of the masks M1, M2 is to make sure that the casting material does not flow to areas/places where it is not needed/wanted.

In an embodiment, the method further comprises casting first end plate PL1 to the first end E1 of the stack of core elements. Additionally, the method comprises casting second end plate to the second end E2 of the stack of core elements. Preferably, the casting of the interconnection casts C1-C4 and the casting of the first and second end plates PL1, PL2 is done in such way that the casting forms a unitary cast comprising the interconnection casts C1-C4 and the casted first and second end plates PL1, PL2.

In an embodiment, in addition to the casting of the interconnection casts C1-C4, a support cast SC is casted to the circumference CF a central axial hole CAH of the rotor core. This central axial hole CAH is by formed by aligning consecutive central holes CEH of the consecutive core elements 101-104.

Referring to FIG. 2 and as mentioned earlier, support cast SC can form an adapter for contacting a rotor shaft. One or more locking grooves LG or other locking element for the shaft can be machined to the support cast.

In an embodiment, the casting of the interconnection casts C1-C4 and the casting of the support cast SC is done in such way that the casting forms a unitary cast comprising the interconnection casts C1-C4 and the support cast SC. Preferably the method is such that the casting of the interconnection casts C1-C4 and the casting of the first and second end plates PL1, PL2 and the casting of the support cast SC is done in such way that the casting forms a unitary cast comprising the interconnection casts C1-C4 and the casted first and second end plates PL1, PL2 and the support cast SC.

FIG. 5 illustrates, at the first end E1 of the rotor, the rotor after the casting of the interconnection casts C1-C4 and the support cast SC, but for informative purposes without the cast-related first mask M1. In practice, in an embodiment, the mask M1 is left where it was set before the casting operation. Therefore, when casting the interconnection casts C1-C4 and simultaneously casting the support cast SC and simultaneously casting also the end plate PL1 (and PL2) to the end of the rotor/rotor core, the mask M1 remains at the end E1 of core stack of core elements, especially at the end of the core element 101 and therefore the mask M1 is at least partially covered by the casted end plate PL1.

In addition to being a casting mask, mask M1 is also supporting the relatively thin rim R of the core element 101, by using wings/protrutions MPR.

In masks M1, M2, in FIGS. 1-4, one can see openings M1OP, M2OP for accommodating temporary binding elements which are removed once the casted structures i.e. interconnection casts C1-C4, casted end plates PL1, PL2 and the casted support cast SC have reached a cool enough temperature causing rigidity for the rotor/rotor core.

It will be obvious to a person skilled in the art that, as technology advances, the inventive concept can be implemented in various ways. The invention and its embodiments are not limited to the example embodiments described above but may vary within the scope of the claims.

The invention claimed is:

1. A rotor for a synchronous reluctance electric machine, wherein the rotor comprises:
a plurality of consecutive core elements, the core elements comprising material of magnetic conductance;
a binding structure for holding together the stack of consecutive core elements so as to form a rotor core having a first end and a second end,
the core elements are such that core element comprises at least two adjacent sectorial sections at least partially around a rotational axis of the rotor, each core element further comprising central area surrounding the rotational axis of the rotor, and
each sectorial section comprise one or more flux barriers, and wherein
the binding structure for core elements of the rotor of the synchronous reluctance electric machine is a casted structure comprising interconnection casts that are casted into channels extending through the stack or core elements, and
wherein those channels for the interconnection casts and the corresponding interconnection casts are located in the rotor core in an area defined by the flux barriers of the adjacent sectorial sections of each core element and the central area of each core element, wherein the binding structure further comprises end plates casted to the first end of the rotor core and to the second end of the rotor core, the casted end plates and the casted interconnection casts therebetween forming a unitary casted structure.

2. The rotor according to claim 1, wherein those channels for the interconnection casts and the corresponding interconnection casts are located in the rotor core in an area defined by the innermost flux barriers of the sectorial sections of each core element and the central area of each core element.

3. The rotor according to claim 1 wherein at least one of the casted end plates, that form unitary casted structure with casted interconnection casts, comprises one or more casted balancing elements.

4. The rotor according to claim 1, wherein the interconnection cast completely fills the corresponding channel.

5. The rotor according to claim 1, wherein at both ends of rotor core the rotor core comprises mask for casting, and that those masks are covered by the corresponding end plates that are casted to the first and second end of rotor core.

6. The rotor according to claim 1, wherein between adjacent sectorial sections there are flux conducting areas extending at least partly radially between the outer rim of the core element and the central area of the core element, said central area surrounding the rotational axis of the rotor.

7. The rotor of claim 6, wherein the channels for interconnection casts and the corresponding interconnection casts are located within said flux conducting areas.

8. The rotor according to claim 1, wherein the interconnection casts are configured to have a rotational symmetry with respect to the rotational axis of the rotor.

9. The rotor according to claim 1, wherein the shape of the edge of the interconnection cast and/or the shape of the edge of the channel for the interconnection cast at least partly follows the direction of the flux barrier.

10. The rotor according to claim 1, wherein, in addition to the interconnection casts, the rotor core comprises a central support cast casted to the circumference a central axial hole extending through the central areas of the consecutive core elements.

11. The rotor according to claim 2, wherein in addition to the interconnection casts and the end plates casted to both ends of the rotor core, also the central support cast belongs to the same unitary casted structure.

12. A synchronous reluctance electric machine, wherein the electric machine comprises a rotor according to claim 1.

13. A method of manufacturing a rotor of a synchronous reluctance electric machine, the method comprising
forming core elements of the rotor, wherein at least two sectorial sections and a central hole are formed to each core element, those sectorial sections locating at least partially around the central hole of the core element, said center hole defining the location of the rotational axis of the rotor, and wherein at least one flux barrier is formed to each sectorial section,
stacking the core elements to a stack of consecutive core elements, and
binding the stack of core element so as to hold together the stack of consecutive core elements so as to form a rotor core having a first end and a second end, and wherein
when forming each core element, each core element is formed to include at least one interconnecting sub channel extending axially through the core element, said interconnecting sub channel being formed to a core element area defined by the flux barriers of the adjacent sectorial sections of the core element and the central hole of the core element, and wherein
the binding of stack of core elements is done by casting so that the cast material is directed to flow into one or more interconnection channels locating in an area defined by the flux barriers of the adjacent sectorial sections of the core elements and the central holes of the core elements, said interconnection channels being formed by aligning interconnecting sub channels of the consecutive core elements,
casting first end plate to the first end of the stack of core elements,
casting second end plate to the second end of the stack of core elements, and wherein
the casting of the interconnection casts and the casting of the first and second end plates is done in such way that the casting forms a unitary cast comprising the interconnection casts and the casted first and second end plate.

14. The method according to claim 13, wherein in addition to the casting of the interconnection casts and end plates, a support cast is casted, said support cast being casted to the circumference of a central axial hole of the rotor core, said central axial hole being formed by aligning consecutive central holes of the consecutive core elements.

15. The rotor according to claim 3, wherein in addition to the interconnection casts and the end plates casted to both ends of the rotor core, also the central support cast belongs to the same unitary casted structure.

16. The rotor according to claim 4, wherein in addition to the interconnection casts and the end plates casted to both ends of the rotor core, also the central support cast belongs to the same unitary casted structure.

17. The rotor according to claim 5, wherein in addition to the interconnection casts and the end plates casted to both ends of the rotor core, also the central support cast belongs to the same unitary casted structure.

18. The synchronous reluctance electric machine according to claim 12, wherein those channels for the interconnection casts and the corresponding interconnection casts are located in the rotor core in an area defined by the innermost flux barriers of the sectorial sections of each core element and the central area of each core element.

19. The synchronous reluctance electric machine according to claim 12, wherein at least one of the casted end plates, that form unitary casted structure with casted interconnection casts, comprises one or more casted balancing elements.

20. The synchronous reluctance electric machine according to claim 12, wherein the interconnection cast completely fills the corresponding channel.

* * * * *